US012657163B2

(12) United States Patent
Custodio et al.

(10) Patent No.: US 12,657,163 B2
(45) Date of Patent: Jun. 16, 2026

(54) SYNCHRONIZING DATA RECOVERY FILES IN CLOUD-BASED DATABASE MANAGEMENT PLATFORMS

(71) Applicant: FMR LLC, Boston, MA (US)

(72) Inventors: Jason A. Custodio, Manchester, NH (US); Raghu Kumar Thukral, Apex, NC (US); Rabin Gurung, New Hill, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/941,272

(22) Filed: Nov. 8, 2024

(65) Prior Publication Data

US 2026/0133941 A1    May 14, 2026

(51) Int. Cl.
*G06F 16/178* (2019.01)
*G06F 11/1446* (2026.01)

(52) U.S. Cl.
CPC ........ *G06F 16/178* (2019.01); *G06F 11/1469* (2013.01); *G06F 2201/80* (2013.01)

(58) Field of Classification Search
CPC . G06F 16/178; G06F 11/1469; G06F 2201/80
See application file for complete search history.

(56) References Cited

U.S. PATENT DOCUMENTS

| | | | |
|---|---|---|---|
| 7,788,225 B2 | 8/2010 | Fish et al. | |
| 10,374,970 B2 * | 8/2019 | Patil | ..................... H04L 47/783 |
| 10,803,048 B2 | 10/2020 | Johnston | |
| 10,810,229 B2 | 10/2020 | O'Shaugnessy | |
| 10,917,358 B1 * | 2/2021 | Herle | .................... H04L 47/783 |
| 11,645,261 B2 | 5/2023 | Kumar et al. | |
| 12,321,244 B1 * | 6/2025 | Rather | ................ G06F 11/1469 |

(Continued)

OTHER PUBLICATIONS

S. Holliday et al., "Deriving Value from Data for Oracle Database@Azure Workloads with OCI GoldenGate," Oracle Database Insider, available at https://blogs.oracle.com/database/post/deriving-value-from-data-for-oracle-databaseazure-workloads-with-oci-goldengate, Jul. 3, 2024, 4 pages.

(Continued)

*Primary Examiner* — Alicia M Willoughby

(74) *Attorney, Agent, or Firm* — Cesari and McKenna, LLP

(57) ABSTRACT

Methods and apparatuses for synchronizing data recovery files in cloud-based database management platforms include a server that allocates physical storage media for database management platforms hosted in a cloud computing environment and attaches a source database management platform in a first region of the environment to the allocated storage media. The server attaches a target database management platform in a second region of the environment to the allocated storage media. The server establishes a periodic replication job between the source database management platform and the target database management platform, including validating change files associated with differential data changes in a primary database instance and transmitting the validated change files to the target database management platform for replication in a secondary database instance.

19 Claims, 3 Drawing Sheets

(56)                References Cited

U.S. PATENT DOCUMENTS

| | | | | |
|---|---|---|---|---|
| 2007/0136548 A1* | 6/2007 | Mane | .................... | G06F 16/128 |
| | | | | 711/170 |
| 2015/0370827 A1* | 12/2015 | Parkison | ............... | G06F 16/178 |
| | | | | 707/610 |
| 2016/0063050 A1* | 3/2016 | Schoen | ................. | G06F 16/214 |
| | | | | 707/690 |
| 2019/0171650 A1 | 6/2019 | Botev et al. | | |
| 2021/0344559 A1* | 11/2021 | Kabbinale | ........... | H04L 41/0873 |
| 2023/0056217 A1* | 2/2023 | Rathi | .................. | G06F 11/1451 |
| 2023/0129469 A1* | 4/2023 | Ding | ................... | G06F 11/1448 |
| | | | | 707/610 |
| 2023/0224257 A1* | 7/2023 | Deviprasad | ........... | H04L 47/828 |
| | | | | 709/226 |
| 2023/0229670 A1 | 7/2023 | Ranjan | | |
| 2023/0342658 A1* | 10/2023 | Tripathi | ............... | G06F 9/5072 |
| 2023/0409408 A1* | 12/2023 | Walshe | ................. | G06F 9/5077 |
| 2023/0409540 A1* | 12/2023 | Singhal | ............... | G06F 11/1464 |
| 2024/0126781 A1 | 4/2024 | Wong et al. | | |
| 2024/0126782 A1 | 4/2024 | Wong et al. | | |
| 2024/0126783 A1 | 4/2024 | Wong et al. | | |
| 2024/0302988 A1* | 9/2024 | Behera | .................... | G06F 3/065 |
| 2024/0394245 A1* | 11/2024 | Dye | ........................ | G06F 16/27 |
| 2025/0078124 A1* | 3/2025 | Chen | ..................... | G06Q 50/50 |

OTHER PUBLICATIONS

M. Vinson, "Implement Oracle GoldenGate high availability in the AWS Cloud," AWS Database Blog, available at https://aws.amazon.com/blogs/database/implement-oracle-goldengate-high-availability-in-the-aws-cloud/, Aug. 10, 2021, 9 pages.

"Replicate data between cloud databases in different regions," Oracle Cloud Infrastructure Documentation, available at https://docs.oracle.com/en-us/iaas/goldengate/doc/replicate-data-cloud-databases-different-regions.html, May 2, 2024, 4 pages.

* cited by examiner

100

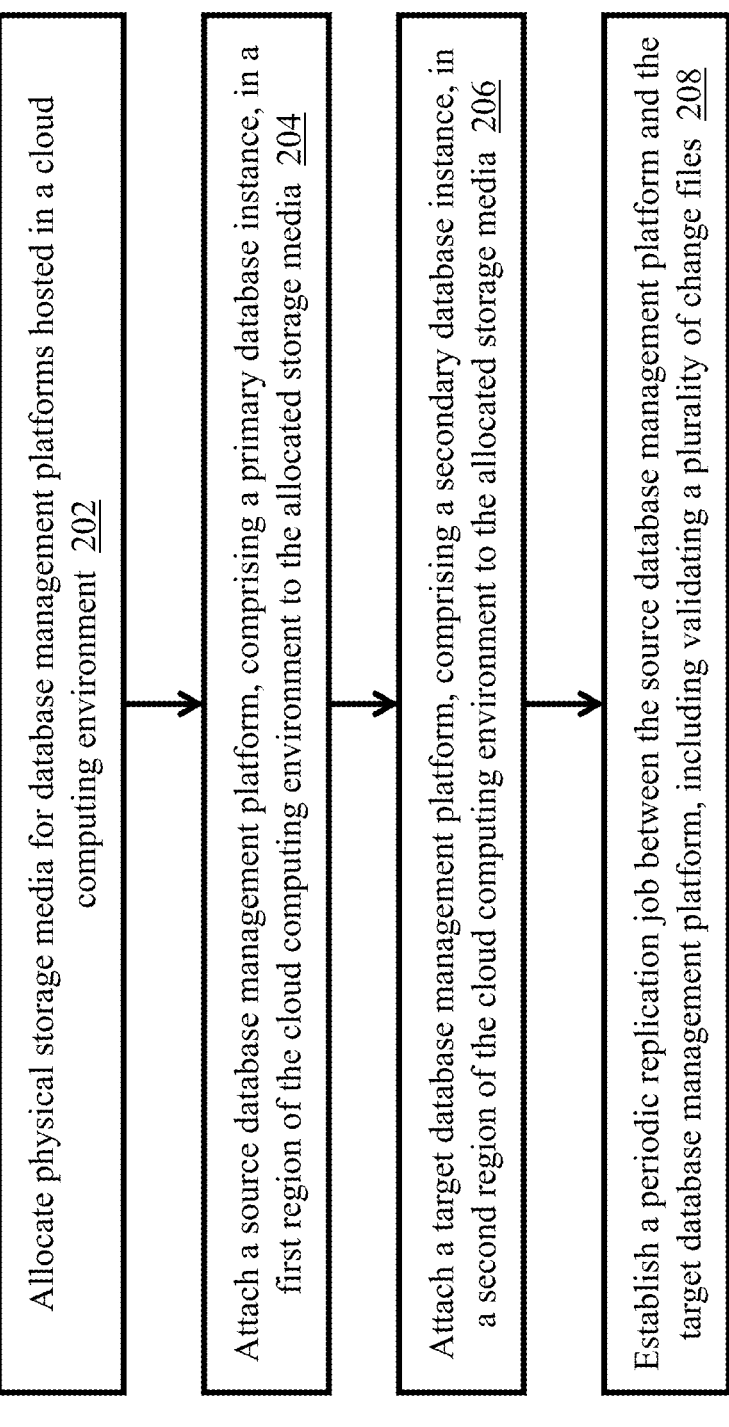

Allocate physical storage media for database management platforms hosted in a cloud computing environment 202

Attach a source database management platform, comprising a primary database instance, in a first region of the cloud computing environment to the allocated storage media 204

Attach a target database management platform, comprising a secondary database instance, in a second region of the cloud computing environment to the allocated storage media 206

Establish a periodic replication job between the source database management platform and the target database management platform, including validating a plurality of change files 208

FIG. 2

1. Cancel replication job between platform 108a and platform 108b
2. Provision temporary DB mgmt. platform
3. Attach temporary DB platform to storage media
4. Create temporary DB instance
5. Establish new replication job between platform 108b and platform 302

SYNCHRONIZING DATA RECOVERY FILES IN CLOUD-BASED DATABASE MANAGEMENT PLATFORMS

TECHNICAL FIELD

This application relates generally to methods and apparatuses, including computer program products, for synchronizing data recovery files in cloud-based database management platforms.

BACKGROUND

Significant advances in computing and network technology over the last decade have contributed to the rise of cloud computing services and platforms. These cloud computing services enable enterprises to deploy and host their computing systems, applications, and related services (e.g., web servers, database servers, application servers) in a remote, shared, and often virtualized computing environment that does not need to be actively managed by the enterprise. Enterprises can thus take advantage of the immense computing power, memory storage, network bandwidth, and other highly scalable resources provided by such cloud computing services to provide a more flexible and efficient computing infrastructure for its employees and customers.

As a result, many enterprises have sought to automate deployment of key data processing applications and services—such as database management platforms like Azure Cloud Factory™ from Microsoft Corp.—to cloud environments. This endeavor has led to some technical challenges and obstacles. In one example, an enterprise may utilize application- or organization-specific database configurations or deployment pipelines for provisioning a database management platform in a cloud computing environment. Often, there are no tools available in the cloud computing platform to accomplish provisioning and deployment of the database management platform in an automated manner—for example, the cloud platform may not support deployment of pipelines or supporting infrastructure (e.g., virtual machines, endpoints, linked services) without appropriate owner or user approval. Therefore, manual, time-intensive and resource-intensive steps must be taken to both complete the initial provisioning and deployment, and to undertake ongoing maintenance and monitoring of the database management platform—which can lead to delays, errors, and lack of repeatability for such actions. In addition, the cloud computing platform may not have the out-of-the-box capability to integrate with other existing, on-premises enterprise systems (e.g., authentication, data security, application and network monitoring).

Importantly, depending upon the requirements of the locally-hosted computing systems, the cloud computing services may not be able to provide a level of service to meet service level agreement (SLA) requirements—for example, some systems may need resiliency options for critical enterprise database systems such as high-availability (HA) and failover/switchover protocols. Notably, real time data synchronization and replication of database change files (such as differentials and/or trail files) is essential for the purpose of achieving seamless cutover to another cloud region in a disaster recovery scenario. Existing vendor tools do not provide for such replication mechanisms across regions in a cloud deployment. Instead, such tools are limited to replicating data sets logically from source to target at a database row level, either one-way or bi-directionally, which is not a true solution to a real time disaster recovery. In addition, these tools do not provide a valid physical copy of data or a utility to copy change files physically across regions.

SUMMARY

Therefore, what is needed are methods and systems for enabling automated synchronization and replication of differential database change files incrementally across deployments in multiple regions of a cloud computing environment. Beneficially, the techniques described herein enable data to be readily available and consumable in a different cloud region or datacenter during a disaster recovery or other failover event. Further, the methods and systems described herein advantageously provide solutions for deploying, provisioning, and managing cloud-based database management platforms automatically, overcoming the lack of existing tools to accomplish such tasks. The techniques described herein advantageously enable a framework of provisioning, managing, monitoring, and rehydrating database management platforms and their associated virtual computing resources through centralized pipelining and automated continuous integration (CI)/continuous deployment (CD) processes, onboarding of such cloud computing resources to an identity authentication service, and allowing for resiliency, failover, and site swapping to deliver seamless and uninterrupted availability of critical data processing resources.

The invention, in one aspect, features a system for synchronizing data recovery files in cloud-based database management platforms. The system includes a server computing device having a memory for storing computer-executable instructions and a processor that executes the computer-executable instructions. The server computing device allocates physical storage media for database management platforms hosted in a cloud computing environment coupled to the server computing device, the cloud computing environment comprising a plurality of regions. The server computing device attaches a source database management platform in a first region of the cloud computing environment to the allocated storage media, the source database management platform comprising a primary database instance. The server computing device attaches a target database management platform in a second region of the cloud computing environment to the allocated storage media, the target database management platform comprising a secondary database instance. The server computing device establishes a periodic replication job between the source database management platform and the target database management platform, including validating a plurality of change files associated with differential data changes in the primary database instance and transmitting the validated change files to the target database management platform for replication in the secondary database instance, where files required for replication of the primary database instance to the secondary database instance are synchronized between the primary database instance and the secondary database instance upon completion of the periodic replication job.

The invention, in another aspect, features a computerized method of synchronizing data recovery files in cloud-based database management platforms. A server computing device allocates physical storage media for database management platforms hosted in a cloud computing environment coupled to the server computing device, the cloud computing environment comprising a plurality of regions. The server computing device attaches a source database management platform in a first region of the cloud computing environment to the allocated storage media, the source database management platform comprising a primary database instance. The server computing device attaches a target database management platform in a second region of the cloud computing environment to the allocated storage media, the target database management platform comprising a secondary database instance. The server computing device establishes a periodic replication job between the source database management platform and the target database management platform, including validating a plurality of change files associated with differential data changes in the primary database instance and transmitting the validated change files to the target database management platform for replication in the secondary database instance, where files required for replication of the primary database instance to the secondary database instance are synchronized between the primary database instance and the secondary database instance upon completion of the periodic replication job.

Any of the above aspects can include one or more of the following features. In some embodiments, upon detecting that the source database management platform is unavailable, the server computing device provisions a temporary database management platform in the first region of the cloud computing environment, attaches the temporary database management platform to the allocated storage media, and creates a temporary database instance comprising the data files of the primary database instance. In some embodiments, the server computing device cancels the periodic replication job upon detecting that the source database management platform is unavailable. In some embodiments, the server computing device establishes a new periodic replication job between the target database management platform and the temporary database management platform, including validating a plurality of change files associated with differential data changes in the secondary database instance and transmitting the validated change files to the temporary database management platform for replication in the temporary database instance.

In some embodiments, validating the plurality of change files comprises calculating a checksum value for each of the plurality of change files. In some embodiments, the first region of the cloud computing environment and the second region of the cloud computing environment are the same region. In some embodiments, the first region of the cloud computing environment and the second region of the cloud computing environment are different regions.

In some embodiments, the periodic replication job executes at an operating system level of the server computing device. In some embodiments, the physical storage media comprises one or more disk drives. In some embodiments, the source database management platform is attached to the same one or more disk drives as the target database management platform. In some embodiments, the server computing device executes a build pipeline script to initiate the allocation of the storage media and the attaching of the database management platforms to the storage media Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method of synchronizing data recovery files in cloud-based database management platforms.

DETAILED DESCRIPTION

Figure 1:
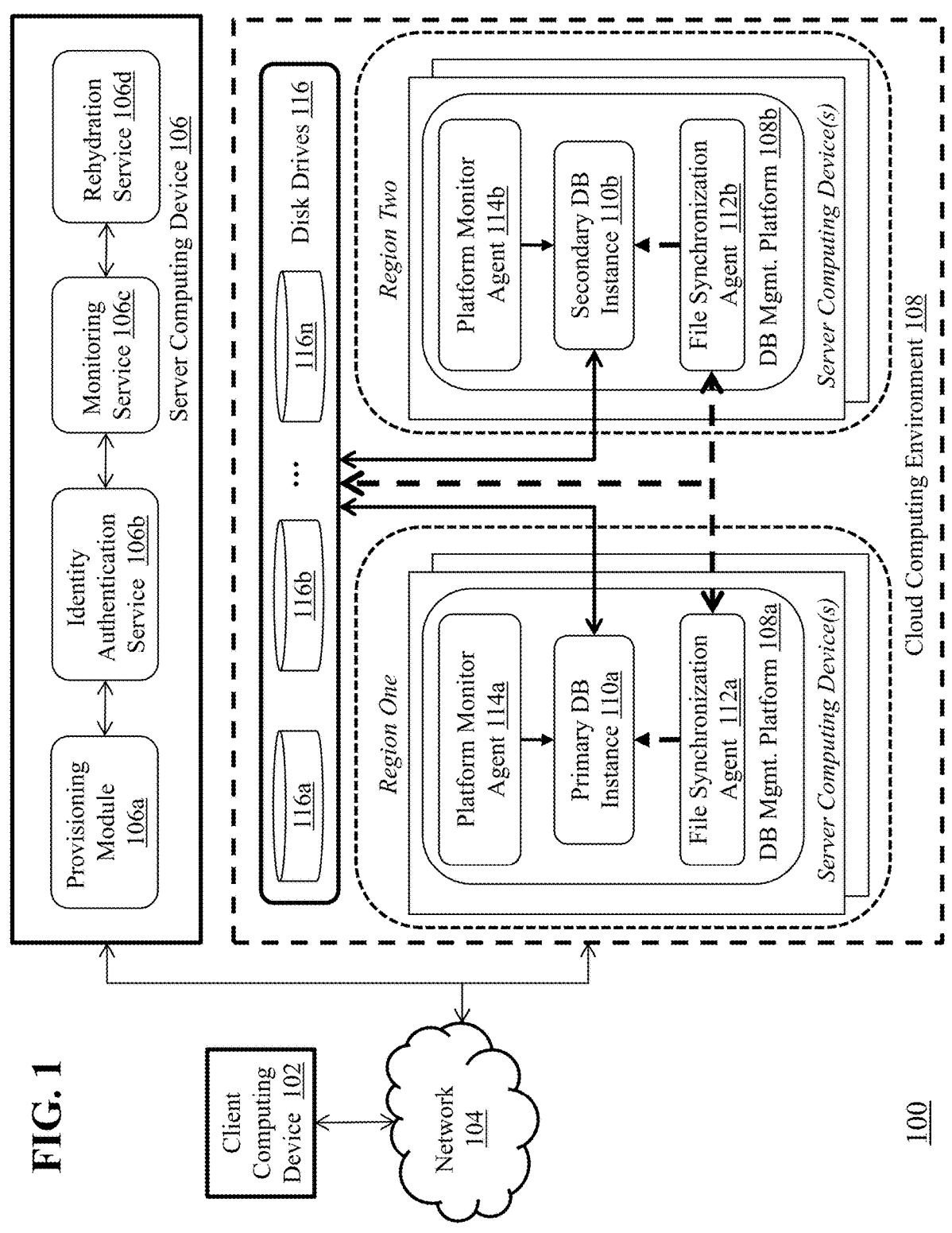
FIG. 1 is a block diagram of a system for synchronizing data recovery files in cloud-based database management platforms.

FIG. 1 is a block diagram of system 100 for synchronizing data recovery files in cloud-based database management platforms. System 100 includes client computing device 102 that is coupled via communications network 104 to server computing device 106 and cloud computing environment 108. Server computing device 106 includes provisioning module 106a, identity authentication service 106b, monitoring service 106c, and rehydration service 106d. Cloud computing environment 108 includes a plurality of database (DB) management platforms 108a, 108b executing on one or more server computing devices in different regions in cloud computing environment 108. In some embodiments, DB management platforms 108a, 108b can comprise one or more virtual resources, such as containers, virtual machines (VMs), and/or other packaged computing environments that enable execution of the DB management platforms. DM management platform 108a in Region One includes primary database (DB) instance 110a, file synchronization agent 112a, and platform monitor agent 114a. VM 108b in Region Two includes secondary DB instance 110b, file synchronization agent 112b, and platform monitor agent 114b. Cloud computing environment 108 further includes one or more physical disk drives 116a-116n (collectively, 116).

Client computing device 102 connects to communications network 104 in order to communicate with server computing device 106 and cloud computing environment 108 to provide input and receive output relating to the process of synchronizing data recovery files in cloud-based database management platforms as described herein. Client computing device 102 can be coupled to a display device (not shown). For example, client computing device 102 can provide a detailed graphical user interface (GUI) via the display device that presents output resulting from the methods and systems described herein, where the GUI is utilized by an operator to review and monitor database management platform status information, including but not limited to replication status, load status, and availability status, provided by server computing device 102 and/or cloud computing environment 108.

Exemplary client devices 102 include but are not limited to desktop computers, laptop computers, tablets, mobile devices, smartphones, and internet appliances. It should be appreciated that other types of computing devices that can connect to the components of system 100 can be used without departing from the scope of invention. Although FIG. 1 depicts a single client computing device 102, it should be appreciated that system 100 can include any number of client devices.

Communication network 104 enables the other components of system 100 to communicate with each other in order to perform the process of synchronizing data recovery files in cloud-based database management platforms as described herein. Network 104 may be a local network, such as a LAN, or a wide area network, such as the Internet and/or a cellular network. In some embodiments, network 104 is comprised of several discrete networks and/or sub-networks (e.g., cellular to Internet) that enable the components of the system 100 to communicate with each other.

Server computing device 106 is a combination of hardware, including one or more special-purpose processors and one or more physical memory modules, and specialized software modules—such as modules 106a-106d—that are executed by a processor of server computing device 106, to receive data from other components of system 100, transmit data to other components of system 100, and perform functions for synchronizing data recovery files in cloud-based database management platforms as described herein. In some embodiments, modules 106a-106d are specialized sets of computer software instructions programmed onto a dedicated processor in server computing device 106 and can include specifically designated memory locations and/or registers for executing the specialized computer software instructions. Further explanation of the specific processing performed by modules 106a-106d will be provided below.

Cloud computing environment 108 is a combination of hardware, including one or more special-purpose processors and one or more physical memory modules, and specialized software—such as database (DB) management platforms 108a, 108b—that are executed by processor(s) of one or more server computing devices in cloud computing environment 108, to receive data from other components of system 100, transmit data to other components of system 100, and perform functions for synchronizing data recovery files in cloud-based database management platforms as described herein. Each DB management platform 108a, 108b comprises a database (DB) instance 110a, 110b, a file synchronization agent 112a, 112b, and a platform monitor agent 114a, 114b. In some embodiments, elements 110a-110b, 112a-112b, and 114a-114n comprise software modules such as one or more containers instantiated within DB management platforms 108a, 108b that includes a plurality of files and configuration information (i.e., software code, environment variables, libraries, other dependencies, and the like). Cloud computing environment 108 can be configured to execute many instances of DB management platforms 108a, 108b in isolation from each other, that access a single operating system (OS) kernel. In some embodiments, cloud computing environment 108 executes each DB management platform 108a, 108b and/or the component elements 110a-110b, 112a-112b, and 114a-114b in a separate OS process, and constrains each element's access to physical resources (e.g., CPU, memory) of the corresponding server computing device so that a single DB management platform 108a-108b does not utilize all of the available physical resources. Upon execution, one or more server computing devices in cloud computing environment 108 executes application code and data stored in DB management platforms 108a-108b for delivery, configuration, monitoring, presentation, and/or manipulation of application functions and associated data contained in, e.g., DB instances 110a, 110b by one or more endpoint devices. In one embodiment, cloud computing environment 108 is deployed using a commercially available cloud computing platform. As shown in FIG. 1, the resources of cloud computing environment 108 can be distributed into a plurality of regions which can be defined according to certain geographic and/or technical performance requirements. Each region can comprise one or more datacenters connected via a regional network that meets specific low-latency requirements. Inside each region, cloud computing environment 108 can be partitioned into one or more availability zones (AZ), which are physically separate locations used to achieve tolerance to, e.g., hardware failures, software failures, disruption in connectivity, unexpected events/disasters, and the like. Typically, the availability zones are connected using a high-performance network (e.g., round trip latency of less than two milliseconds). It should be appreciated that other types of computing resource distribution and configuration in a cloud environment can be used within the scope of the technology described herein.

Cloud computing environment 108 also comprises a plurality of disk drives 116a-116n (collectively, 116)—one or more of which are coupled to the database instances 110a, 110b of platforms 108a, 108b. Disk drives 116a-116n comprise physical disk drives (e.g., hard disk drives (HDD) and/or solid-state drives (SSD)) that are used by DB management platforms 108a, 108b to store data elements associated with database instances 110a, 110b. In the example of a cloud computing environment, these disk drives 116a-116n can be managed/shared disks used by a plurality of different resources or computing devices. Typically, a database instance 110a, 110b is attached to a particular disk drive 116a when initialized and is detached from the disk drive when one or more the DB management platforms 108a, 108b and/or the database instance 110a, 110b is removed, updated, re-initialized, or rehydrated.

In some embodiments, DB management platforms 108a, 108b are configured according to a disaster recovery (DR) architecture. For example, DB management platform 108a with primary DB instance 110a can operate as the main active platform which receives data requests from endpoint devices or other computing devices in a live production environment. DB management platform 108b with secondary DB instance 110b can operate as a standby platform which does not receive active production data requests. Instead, in the event of an outage, hardware failure or other technical incident affecting the normal operation of DB management platform 108a, active production traffic is re-routed to DB management platform 108b so that end users experience uninterrupted access to the data stored and maintained in DB instances 110a, 110b. As part of the DR architecture, it is necessary to ensure that certain data files associated with DB instances 110a, 110b are synchronized between the respective regions, so that primary DB instance 110a is replicated to secondary DB instance 110b without suffering from missing or incomplete data.

In addition to the above features, the systems and methods described herein provide for seamless updating of resources and elements 110a, 110b, 112a, 112b, 114a, and 114b of the database management platforms 108a-108b through a process of rehydration. As can be appreciated, existing deployed database management systems may require periodic or emergency software image updates (e.g., when configuration updates are required, when a new database or supporting software version and/or operating system version is released, when a data resource is changed, when a new security patch is released, etc.). Rehydration service 106d can be configured to initiate a rehydration process to refresh one or more of the reserved virtual computing resources in the database management platform in cloud computing environment 108. In some embodiments, the user at client computing device 102 can interact with rehydration service 106d to initiate the rehydration process. In other embodiments, rehydration service 106d periodically analyzes the software and resources utilized in each platform 108a, 108b in the database management platform and determines when to initiate rehydration (e.g., a new software version, database version, or OS version is released; a security patch is ready for implementation, etc.).

Rehydration service 106*d* detects that one or more of platform 108*a*, 108*b* and/or one or more virtual computing resources within the platform 108*a*, 108*b* needs to be updated. For example, when a new version of software associated with the database management platform is released, provisioning module 106*c* can be configured to determine that the current version of the operating system software deployed in platform 108*a*, 108*b* is out of date (e.g., by comparing a build number, version number, or other similar indicia). In another example, rehydration service 106*d* can be configured to determine that a code base associated with database management platform has been modified (e.g., via a build instruction or other indicia from a code development management system and/or issue tracking ticket system). A common rehydration process is to update software associated with platform 108*a*, 108*b* periodically to ensure the latest patches and functionality is contained in the platform 108*a*, 108*b*.

To begin the rehydration process, rehydration service 106*d* detaches the physical disk drive 116*a*-116*n* from the corresponding database instance 110*a*, 110*b* in the platform 108*a*, 108*b* that is being refreshed. Next, rehydration service 106*d* deletes one or more virtual computing resource(s) (e.g., software modules, linked services, libraries, OS components) in the platform 108*a*, 108*b* that will be updated via rehydration. In some embodiments, rehydration service 106*d* can stop/remove the entire platform 108*a*, 108*b* from cloud computing environment 108 and deploy a new platform (with updated software) using the same computing resources that were allocated for the platform that was removed.

Rehydration service 106*d* then deploys one or more updated software resources in the corresponding platform 108*a*, 108*b*. In some embodiments, rehydration service 106*d* uses updated resource templates (i.e., newer or changed templates that are different from those originally used to create the platform 108*a*, 108*b*). For example, rehydration service 106*d* can deploy the new software or services in the platform 108*a*, 108*b* using an updated software image file (e.g., an operating system image file or a security patch image file) that was created to deploy the new version of the software and/or virtual computing resource(s) in cloud environment 108. After the new virtual computing resource is created in platform 108*a*, 108*b*, rehydration service 106*d* restarts the updated platform 108*a*, 108*b*. After rehydration is complete, rehydration service 106*d* re-attaches the physical data resources (i.e., disk drives 116 that were previously detached) to the corresponding database instance 110*a*, 110*b* in the restarted platform 108*a*, 108*b*.

Upon deploying a database management platform, provisioning module 106*a* can validate the deployment to confirm that all components of the database management platform are installed and functioning correctly in the cloud computing environment 108. In some embodiments, the deployment pipeline script executed by provisioning module 106*a* includes one or more validation steps-whereby module 106*a* issues requests to cloud computing environment 108 (including but not limited to platforms 108*a*, 108*b* and/or the associated elements 110*a*-110*b*, 112*a*-11*b*, 114*a*-114*b*) to confirm that the database management platform is operating as expected. In some embodiments, provisioning module 106*a* can compile and transmit a validation report to a remote computing device (e.g., client computing device

102) that includes deployment details and information on the results of the deployment validation.

As can be appreciated, system 100 of FIG. 1 can advantageously implement automated workflows and processes to accomplish the data transfer and replication needed for the disaster recovery architecture described above, instead of relying on manually-invoked jobs and user-based monitoring and intervention to allocate computing resources, infrastructure, and security requirements needed to initiate database file transfer and synchronization prior to a DR event while also configuring new traffic routing rules and flows to enable end users to access secondary DB instance 110*b* upon occurrence of a DR event.

FIG. 2 is a flow diagram of a computerized method 200 of synchronizing data recovery files in cloud-based database management platforms, using system 100 of FIG. 1. In one example, a user at client computing device 102 establishes a connection to server computing device 106 via network 104 to configure a replication job that, when executed, automatically validates and transfers change files from DB management platform 108*a* to DB management platform 108*b*. Generally, the change files can comprise files associated with differential data changes in the primary DB instance 110*a* that are transferred to DB management platform 108*b* so that the primary DB instance 110*a* can be replicated in secondary DB instance 110*b*. In some embodiments, the change files include (but are not limited to) trail files generated by the Oracle® GoldenGate™ utility to support the Oracle® database platform.

In some embodiments, the user at client computing device 102 launches a replication orchestration tool that is either installed on client computing device 102 or made available by server computing device 106. For example, the user at client computing device 102 can open browser software and enter an address (e.g., URL) that points to a web-based interface provided by server computing device 106. The web-based interface can receive a request from client computing device 102 via the URL and respond with a graphical user interface (e.g., webpage) that is presented on client computing device 102 which enables the user to configure replication of data files between DB management platforms 108*a*, 108*b* and/or perform other configuration or maintenance operations (e.g., rehydration, software versioning, security monitoring) for DB management platforms 108*a*, 108*b*. In one embodiment, provisioning module 106*a* determines a role of the user at client computing device 102 (e.g., using authentication credentials and/or a user profile provided by the client computing device) and enables user access to provisioning and deployment of software features (e.g., code files, binaries, libraries, etc.) that, when executed, establish the replication job in cloud environment 108. Using the replication orchestration tool, the user can initiate one or more replication automation pipeline workflows to be used in establishing the file replication job. Exemplary replication orchestration tools include but are not limited to DevOps automation tools, such as Jenkins™ (available at www.jenkins.io) and/or UrbanCode Deploy™ (uDeploy) (available at www.urbancode.com/product/deploy), which enable the user to build, test, and execute a code base that configures and establishes the file replication procedure in cloud environment 108.

In some embodiments, the code base includes one or more templates which enable the automatic deployment of a file replication job to cloud computing environment 108, including provisioning of required physical or virtual resources, identification of multiple objects, services, instances (and their dependencies)—i.e., DB instances 110*a*, 110*b*, file synchronization agents 112*a*, 112*b*, and platform monitor agents 114*a*, 114*b*—for the database management platforms 108*a*, 108*b*. The template(s) can be used each time a file replication job is established or changed in cloud environment 108. The template(s) can be preconfigured in cloud environment 108 to provide specific computing resources, memory allocations, deployment instructions, configuration settings, and so forth. In some embodiments, provisioning module 106*a* can establish the replication job using the template(s) in conjunction with one or more application images retrieved from, e.g., a local or remote image repository. In some embodiments, the code base used to configure and initiate the replication job is part of a continuous integration/continuous delivery (CI/CD) process, in which changes, updates, and improvements are continuously made to the code base—which can be frequently executed to re-configure and enhance the deployed database management platform in the cloud environment. In some embodiments, establishing a file replication job between regions of the cloud environment 108 includes provisioning and/or rehydrating one or more the underlying elements in the platforms 108*a*, 108*b*—such as DB instances 110*a*, 110*b*, file synchronization agents 112*a*, 112*b*, and/or platform monitor agents 114*a*, 114*b*.

In some embodiments, prior to establishing the file replication job, provisioning module 106*a* can execute one or more deployment automation pipeline workflows to deploy DB management platforms 108*a*, 108*b*—including the DB instances 110*a*-110*b*, file synchronization agents 112*a*-11*b*, and platform monitor agents 114*a*-114*b*—to certain region(s) of cloud computing environment 108. In one embodiment, deployment may comprise configuration of a database management platform 108*a*, 108*b* (such as Oracle® Database) in a Microsoft® Azure™ cloud environment, including process steps for preparing, packaging, and promoting source code to be used as part of the database management platform 108*a*, 108*b* deployed to cloud environment 108 as well as process steps for reserving cloud environment resources, validating the packaged source code, and configuring and deploying the database management platforms 108*a*, 108*b* in cloud environment 108.

For example, each database management platform 108*a*, 108*b* that is deployed to cloud computing environment 108 utilizes physical resources such as CPU cores and memory of server computing devices in the environment 108. As can be appreciated, the cost to use many commercially available cloud computing platforms depends upon the data storage space, virtual machine (VM) size, processor usage, memory resources, and other capacity requirements imposed by the applications and/or functionality that the end user wishes to deploy in the cloud environment. To ensure that the cloud computing environment 108 has sufficient capacity for hosting and execution of the database management platforms 108*a*, 108*b* in a required configuration, provisioning module 106*a* connects to cloud computing environment 108 (e.g., via an application programming interface (API)) and issues one or more requests to reserve resource capacity (e.g., specifying information such as VM size, region, and quantity of instances to be reserved) in the cloud environment prior to deployment of a new database management platform and/or updating/rehydrating an already deployed platform. In some embodiments, upon connecting to cloud computing environment 108, provisioning module 106*a* authenticates to environment 108 using specified authentication credentials associated with, e.g., a user of client computing device 102 and/or an organization that has an account with the corresponding cloud provider. As can be appreciated, cloud computing environment 108 can respond to the capacity reservation request with an acceptance (indicating that the cloud environment has sufficient capacity available to successfully deploy the database management platform using the criteria specified in the request) or a failure (indicating that the cloud environment does not have capacity available that meets the request). For example, a capacity reservation could fail if the account does not have an adequate subscription quota for the requested VM size, location, or zone combination.

Upon completion of any deployment, reconfiguration, and/or rehydration steps needed to configure DB management platforms 108*a*, 108*b* in cloud environment 108 as described above, provisioning module 106*a* of server computing device 106 performs the steps to establish the file replication job for disaster recovery. In some embodiments, module 106*a* executes a build pipeline script (either selected by an end user at client computing device 102 in the replication orchestration tool or identified by provisioning module 106*a*) to initiate the allocation of the storage media and the attaching of the database management platforms to the storage media.

Provisioning module 106*a* allocates (step 202) physical storage media for DB management platforms 108*a*, 108*b* hosted in the cloud environment 108. As mentioned above, cloud environment includes a plurality of physical disk drives 116, one or more of which are coupled to database instances 110*a*, 110*b*. Provisioning module 106*a* can issue one or more requests to reserve disk storage space (e.g., specifying information such as storage size, cloud region, etc.) to be used for DB instances 110*a*, 110*b* prior to deployment of a new database management platform and/or updating/rehydrating an already deployed platform. For example, module 106*a* can allocate a storage volume of a particular size (e.g., 50 GB, 1 TB, etc.) in disk drives 116 for use by one or more DB management platforms. In some embodiments, the allocated physical media is sized to enable storage of data for each DB management platform 108*a*, 108*b* and/or DB instances 110*a*, 110*b*. Also, the storage volume can be allocated in a single disk drive 116*a* or across multiple disk drives in environment 108.

After allocating the physical storage media, provisioning module 106*a* attaches (step 204) a source database management platform (e.g., platform 108*a*) comprising a primary database instance (e.g., instance 110*a*) to the allocated storage media. In some embodiments, provisioning module 106*a* establishes a connection to DB management platform 108*a*, creates a partition on the allocated storage media to store the DB instance 110*a* data, and creates a filesystem on the partition. Provisioning module 106*a* then creates a mount point in the filesystem and mounts the allocated storage media to the mount point. In some embodiments, module 106*a* assigns a universally unique identifier (UUID) for the mount point in the DB management platform 108*a* which can ensure the mount persists across disk restarts. Provisioning module 106*a* can then create primary DB instance 110*a* using the created mount point and corresponding space on the physical storage media.

Similarly, provisioning module 106*a* attaches (step 206) a target database management platform (e.g., platform 108*b*) comprising a secondary database instance (e.g., instance 110*b*) to the allocated storage media. As described previously, the secondary DB instance 110*b* can be a standby instance that is configured to take over live production data operations in a disaster recovery situation where that primary DB instance 110*a* is unavailable. In some embodiments, provisioning module 106*a* establishes a connection to DB management platform 108*b*, creates a partition on the allocated storage media to store the DB instance 110*b* data, and creates a filesystem on the partition. Provisioning module 106*a* then creates a mount point in the filesystem and mounts the allocated storage media to the mount point. In some embodiments, module 106*a* assigns a universally unique identifier (UUID) for the mount point in the DB management platform 108*b* which can ensure the mount persists across disk restarts. Provisioning module 106*a* can then create secondary DB instance 110*b* using the created mount point and corresponding space on the physical storage media.

In some embodiments, the partitions and mount points for each of the primary DB instance 110*a* and secondary DB instance 110*b* can be located on the same physical storage media (i.e., the same one or more disk drives 116)—even where the instances 110*a*, 110*b* are distributed in different regions of the cloud computing environment 108. In some embodiments, the partitions and mount points for the primary DB instance 110*a* and secondary DB instance 110*b* can be located on different physical storage media (i.e., different disk drives 116).

After attaching the DB instances 110*a*, 110*b* to the disk drives 116, partitioning module 106*a* establishes (step 208) a replication job between the source DB management platform 108*a* and the target DB management platform 108*b*, as part of the DR architecture. The periodic replication job relates to change files associated with differential data changes in primary DB instance 110*a*. For example, as data operations are requested by end users and executed against primary DB instance 110*a*, the source DB management platform 108*a* generates change files that record the differential data changes. Generally, the replication job comprises two phases: 1) validation of the change files generated by the source platform 108*a* and 2) transfer of the change files from the source platform 108*a* to the target platform 108*b*.

As part of establishing the replication job, provisioning module 106*a* initializes each file synchronization agent 112*a*, 112*b* in the respective DB management platforms 108*a*, 108*b*. The file synchronization agents 112*a*, 112*b* manage the validation of change files at platform 108*a* and transfer of the change files from platform 108*a* to platform 108*b*. Although FIG. 1 shows a file synchronization agent 112*a*, 112*b* at each platform, in some embodiments, only DB management platform 108*a* includes a file synchronization agent 112*a*.

In some embodiments, the file synchronization agent 112*a*, 112*b* comprises a Cron job that executes periodically (e.g., according to a defined schedule). For example, the file synchronization agent 112*a*, 112*b* can be configured to execute every few minutes, every few hours, several times per day, once per day, etc. In some embodiments, the Cron job is configured to execute at an operating system level of the DB management platform 108*a*, 108*b* and/or one or more server computing devices of cloud environment 108. As mentioned above, the Cron job validates the change files prior to transfer (e.g., to confirm that they should be transferred) and then transfers the validated change files to the target DB management platform (in this case, platform 108*b*). In an example Linux implementation, the Cron job is configured to call the rsync command to transfer the change files to the target DB management platform 108*b* and confirm that the files have been synchronized.

In some embodiments, file synchronization agent 112*a*, 112*b* validates the change files by calculating a checksum for each change file at the source DB management platform 108*a* and for each corresponding change file at the target DB management platform 108*b*, then comparing the respective checksums for each change file to determine whether the change file needs to be transferred. For example, as file synchronization agent 112*a* prepares to transfer the change files, agent 112*a* calculates a checksum for a given change file and determines whether the calculated checksum is the same as the checksum for the file in the target platform 108*b* (meaning the file has not changed since the last transfer) or different than the checksum for the file in the target platform 108*b* (meaning the file has changed). When the checksums are the same, file synchronization agent 112*a* determines that the change file does not need to be transferred to the target platform. When the checksums are different, agent 112*a* validates that the change file should be transferred to the target platform. In some embodiments, file synchronization agent 112*a* can use one of several different checksum algorithms, including but not limited to the MD5 message digest algorithm or secure hash algorithms such as SHA-256. It should be appreciated that file synchronization agent 112*a*, 112*b* can be configured to perform other methodologies for validating whether change files should be transferred between DB management platforms without departing from the scope of technology described herein. Upon establishment of the periodic replication job, file synchronization agent 112*a*, 112*b* executes the change file validation and transfer according to the defined schedule.

As can be appreciated, circumstances may occur where one or more components of DB management platform 108*a*, and/or computing resources in cloud environment 108 that support platform 108*a*, can malfunction, go offline, encounter bandwidth issues or processing bottlenecks, or otherwise become unavailable. In these circumstances, system 100 can promote the standby DB management platform 108*b* (with secondary DB instance 110*b*) to active status, thereby enabling platform 108*b* to receive production traffic and process data requests originating from end users. For example, monitoring service 106*c* of server computing device 106 connects to each of the platform monitor agents 114*a*, 114*b* deployed in cloud environment 108 to monitor certain elements of each of the corresponding DB management platforms 108*a*, 108*b*. For example, monitoring service 106*c* can actively track characteristics of the database management platforms 108*a*, 108*b*, including operational features of virtual resources used by the platforms in cloud computing environment 108, such as functional status, memory load, data errors, network connectivity, bandwidth, processing overhead, usage, data processing requests, online/offline status, and the like. In some embodiments, monitoring service 106*c* can receive one or more log files generated by platform monitor agents 114*a*, 114*b* and analyze the log files to determine the above characteristics as part of a continual monitoring process. In some embodiments, platform monitor agents 114*a*, 114*b* can capture usage and performance metrics for the primary database instance 110*a* and the secondary database instance 110*b*, respectively. Usage and performance metrics can include, but are not limited to, user connections, transaction load (e.g., reads/writes), data errors, transaction latency, and other types of database statistics.

Upon detecting an undesirable or adverse condition occurring in one or more of the platforms 108*a*, 108*b* (such as a computing resource failure) and/or the database instances 110*a*, 110*b* (such as a data read/write error), monitoring service 106*c* can execute a failover process which redirects traffic from the failing platform 108*a* in one region to another platform 108*b* in another region (e.g., by updating routing tables with address information for platform 108b) in order to maintain continuity of data processing availability and system functionality. In some embodiments, monitoring service 106c can additionally transmit alert messages received from one or more of platform monitor agents 114a, 114b via an established connection when a failure event occurs at the associated platform 108a, 108b. The alert message can be transmitted to, e.g., an end user device such as client computing device 102 so that system administrators and other personnel can be informed of the service interruption. Alert messages can also be generated and transmitted by monitoring service 106c in the event that failures or errors are detected at one or more disk drives 116 and/or other system resources that are connected to cloud environment 108.

As part of the failover process, secondary DB instance 110b can be updated using the differential data in the change files that were previously transferred to platform 108b as part of the replication job described above. Advantageously, the replication process enables the production data from primary DB instance 108a to be data to be readily available and to be consumed in a different region or datacenter (e.g., at secondary DB instance 108b) and for the database systems and applications to fail over seamlessly in a disaster scenario without impacting end users.

In some embodiments, during the failover process, provisioning module 106a can activate to provision a temporary database management platform with a new DB instance in another region of cloud environment 108 (e.g., a region that is different from the region where secondary DB instance 108b is located) and establish a replication job between the now-active DM management platform 108b and the temporary DB management platform. In this way, the newly created DB instance in the temporary management platform becomes the standby platform in case the platform 108b and/or DB instance 110b encounter performance errors or downtime.

Figure 3:
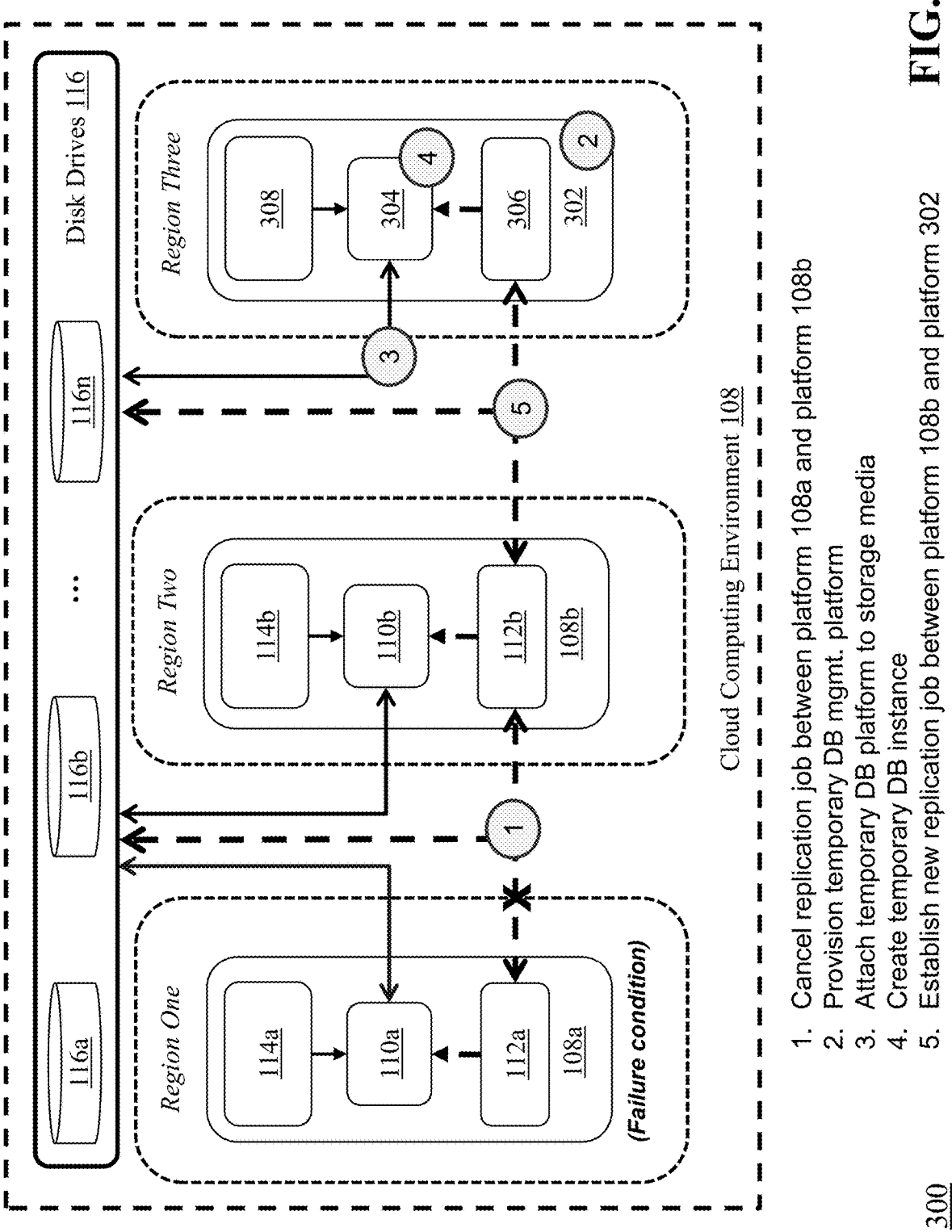
FIG. 3 is a flow diagram of a process for establishing a temporary database management platform in a cloud computing environment in a disaster recovery scenario and synchronizing data recovery files.

FIG. 3 is a flow diagram of a process 300 for establishing a temporary database management platform in a cloud computing environment in a disaster recovery scenario and synchronizing data recovery files, using system 100 of FIG. 1. Once monitoring module 106c detects that a failover should be initiated (as described above), module 106c instructs file synchronization agent 112a of DB management platform 108a in Region One to cancel (item 1 in process 300) the existing replication job that transfers change files from platform 108a to DB management platform 108b in Region Two. For example, module 106c can issue a command to the operating system associated with DB management platform 108a and pause or remove the Cron job.

Next, provisioning module 106a provisions and deploys (step 2 of process 300) a temporary DB management platform 302 in another region (e.g., Region Three) of cloud computing environment 108. Generally, the provisioning and deployment of the temporary database management platform 302 can include actions such as installing, configuring, and validating the cloud-based virtual resources needed to operate the platform 302, and installing and configuring file synchronization agent 306 and platform monitor agent 308, among other tasks. As mentioned previously, provisioning module 106a can use a workflow script to execute each step of the deployment using packaged source code identified in the script. As shown in FIG. 3, temporary DB instance 304 is configured as a standby DB instance in relation to secondary DB instance 110b (which is taking over as the primary instance).

As part of creating the database instances, provisioning module 106a attaches (step 3 of process 300) one or more physical storage media (e.g., disk drives 116) to the temporary database management platform 302 for use as physical storage locations for the temporary database instance 304 as described previously. Provisioning module 106a can connect to the allocated disk drives 116, determine characteristics like storage capacity, latency, bandwidth, availability, and the like for each disk drive, and select one or more disk drives/locations to attach to the temporary database instance.

In some embodiments, provisioning module 106a connects to temporary DB management platform 302 and creates (step 4 of process 300) a database instance (i.e., instance 304) using, e.g., a database image retrieved from a local or remote image repository. For example, provisioning module 106a can retrieve a database image and deploy the database image into the platform 302. The database image can be a default database image used in the cloud environment 108 or a customized database image (either newly created for use in the cloud environment 108, uploaded from the server computing device 106, or selected from a network repository). In one example, the database image can be a database-specific Linux™ image that corresponds to a particular database version. In another example, the database image can be a non-database specific Linux image and/or a custom image.

Also, in some embodiments, provisioning module 106a can integrate the newly deployed database management platform 302 in the cloud environment 108 with identity authentication service 106b of server computing device 106. For example, in some infrastructures, server computing device 106 can maintain an on-premises user access management module such as identity authentication service 106b. To ensure seamlessness and uniformity of access control from on-premises to cloud, it is desirable to synchronize user accounts between the local identity authentication service 106b and the cloud environment 108. This also enables users to access the temporary DB instance 304 according to the specific permissions/roles assigned to them in the on-premises system. In some embodiments, identity authentication service 106b is configured to connect to the cloud environment 108 and establish a link relationship between a user of the identity authentication service 106b and a corresponding cloud representation of the user (that is maintained by the cloud service provider). The configuration of the cloud environment 108 enables each of the components of the database management platform to access the user access information when responding to requests (e.g., data read/write/update requests, application execution, etc.) that require access to data (e.g., via disk drives 116). Then, when access changes are made to the users in identity authentication service 106b, those changes are synchronized automatically to the cloud environment 108.

Continuing with FIG. 3, provisioning module 106a establishes (step 5 of process 300) a new replication job between the DB management platform 108b and the temporary DB management platform 302. Like the periodic replication job created between platform 108a and platform 108b, the new replication job is configured to validate and transfer change files associated with differential data changes in DB instance 110b to the temporary platform 302. For example, as DB instance 110b and platform 108b becomes established as handling the live production data requests and operations, DB management platform 108b generates change files that record the differential data changes. Provisioning module 106a updates file synchronization agent 112b to enable transfer of change files to the temporary DB management platform 302 and module 106*a* creates a file synchronization agent 306 in platform 302 as necessary to handle the change file transfer process.

As mentioned above, system 100 can implement any or all of the techniques described herein using an automated, script-based approach. For example, provisioning module 106*a* can be configured to store one or more scripts that comprise a series of instructions to automatically carry out the required steps for the functions described in FIGS. 1, 2, and 3. For example, a user at client computing device 102 can connect to server computing device 106 and initiate execution of one or more scripts to create data orchestration platforms and corresponding virtual computing resource infrastructure, configure the high availability patterns described herein according to specified requirements, enable the synchronization of data across regions, resources and instances, integrate the cloud computing environment with the identity authentication service, and perform rehydration of resources and/or instances in the cloud environment in order to update relevant software. In this way, the methods and systems advantageously provide for the automated synchronizing of data recovery files in cloud-based database management platforms across different regions to overcome the lack of existing tools to accomplish such processes.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS™, Microsoft® Azure™, Google® Cloud™, IBM® Cloud™). A cloud computing environment includes a collection of computing resources provided as a service to one or more remote computing devices that connect to the cloud computing environment via a service account-allowing access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN),), a private IP network, an IP private branch exchange (IPBX), a wireless network (e.g., radio access network (RAN), Bluetooth™, near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for synchronizing data recovery files in cloud-based database management platforms, the system comprising a server computing device having a memory for storing computer-executable instructions and a processor that executes the computer-executable instructions to:

issue requests to a cloud computing environment coupled to the server computing device to reserve resource capacity for deployment of database management platforms in the cloud computing environment, the requests including one or more criteria for the reserved resource capacity and authentication credentials associated with an organization account for a service provider of the cloud computing environment, and the cloud computing environment comprising a plurality of regions;

receive acceptance indicia for the requests to reserve resource capacity from the cloud computing environment, the acceptance indicia confirming that the cloud computing environment has sufficient resource capacity to successfully deploy the database management platforms in the cloud computing environment in association with the organization account;

allocate physical storage media for the database management platforms hosted in the cloud computing environment;

attach a source database management platform in a first region of the cloud computing environment to the allocated storage media, the source database management platform comprising a primary database instance, including creating a first partition on the allocated storage media, creating a first filesystem on the first partition, creating a first mount point in the first filesystem, mounting the allocated storage media to the first mount point, and assigning a universally unique identifier for the first mount point in the source database management platform;

attach a target database management platform in a second region of the cloud computing environment to the allocated storage media, the target database management platform comprising a secondary database instance, including creating a second partition on the allocated storage media, creating a second filesystem on the second partition, creating a second mount point in the second filesystem, mounting the allocated storage media to the second mount point, and assigning a universally unique identifier for the second mount point in the target database management platform;

establish a periodic replication job between the source database management platform and the target database management platform, including validating a plurality of change files associated with differential data changes in the primary database instance, and transmit the validated change files to the target database management platform for replication in the secondary database instance, wherein files required for replication of the primary database instance to the secondary database instance are synchronized between the primary database instance and the secondary database instance upon completion of the periodic replication job.

2. The system of claim 1, wherein upon detecting that the source database management platform is unavailable, the server computing device provisions a temporary database management platform in the first region of the cloud computing environment, attaches the temporary database management platform to the allocated storage media, and creates a temporary database instance comprising the data files of the primary database instance.

3. The system of claim 2, wherein the server computing device cancels the periodic replication job upon detecting that the source database management platform is unavailable.

4. The system of claim 3, wherein the server computing device establishes a new periodic replication job between the target database management platform and the temporary database management platform, including validating a plurality of change files associated with differential data changes in the secondary database instance and transmitting the validated change files to the temporary database management platform for replication in the temporary database instance.

5. The system of claim 1, wherein the first region of the cloud computing environment and the second region of the cloud computing environment are the same region.

6. The system of claim 1, wherein the periodic replication job executes at an operating system level of the server computing device.

7. The system of claim 1, wherein the physical storage media comprises one or more disk drives.

8. The system of claim 7, wherein the source database management platform is attached to the same one or more disk drives as the target database management platform.

9. The system of claim 1, wherein the server computing device executes a build pipeline script to initiate the allocation of the storage media and the attaching of the database management platforms to the storage media.

10. A computerized method of synchronizing data recovery files in cloud-based database management platforms, the method comprising:

issuing, by a server computing device, requests to a cloud computing environment coupled to the server computing device to reserve resource capacity for deployment of database management platforms in the cloud computing environment, the requests including one or more criteria for the reserved resource capacity and authentication credentials associated with an organization account for a service provider of the cloud computing environment, and the cloud computing environment comprising a plurality of regions;

receiving, by the server computing device, acceptance indicia for the requests to reserve resource capacity from the cloud computing environment, the acceptance indicia confirming that the cloud computing environment has sufficient resource capacity to successfully deploy the database management platforms in the cloud computing environment in association with the organization account;

allocating, by the server computing device, physical storage media for the database management platforms hosted in the cloud computing environment;

attaching, by the server computing device, a source database management platform in a first region of the cloud computing environment to the allocated storage media, the source database management platform comprising a primary database instance, including creating a first partition on the allocated storage media, creating a first filesystem on the first partition, creating a first mount point in the first filesystem, mounting the allocated storage media to the first mount point, and assigning a universally unique identifier for the first mount point in the source database management platform;

attaching, by the server computing device, a target database management platform in a second region of the cloud computing environment to the allocated storage media, the target database management platform comprising a secondary database instance, including creating a second partition on the allocated storage media, creating a second filesystem on the second partition, creating a second mount point in the second filesystem, mounting the allocated storage media to the second mount point, and assigning a universally unique identifier for the second mount point in the target database management platform; and establishing, by the server computing device, a periodic replication job between the source database management platform and the target database management platform, including validating a plurality of change files associated with differential data changes in the primary database instance, and transmitting the validated change files to the target database management platform for replication in the secondary database instance, wherein files required for replication of the primary database instance to the secondary database instance are synchronized between the primary database instance and the secondary database instance upon completion of the periodic replication job.

11. The method of claim 10, upon detecting that the source database management platform is unavailable, the method further comprising:

provisioning, by the server computing device a temporary database management platform in the first region of the cloud computing environment;

attaching, by the server computing device, the temporary database management platform to the allocated storage media; and creating, by the server computing device, a temporary database instance comprising the data files of the primary database instance.

12. The method of claim 11, further comprising canceling, by the server computing device, the periodic replication job upon detecting that the source database management platform is unavailable.

13. The method of claim 12, further comprising establishing, by the server computing device, a new periodic replication job between the target database management platform and the temporary database management platform, including validating a plurality of change files associated with differential data changes in the secondary database instance and transmitting the validated change files to the temporary database management platform for replication in the temporary database instance.

14. The method of claim 10, wherein validating the plurality of change files comprises calculating a checksum value for each of the plurality of change files.

15. The method of claim 10, wherein the first region of the cloud computing environment and the second region of the cloud computing environment are the same region.

16. The method of claim 10, wherein the periodic replication job executes at an operating system level of the server computing device.

17. The method of claim 10, wherein the physical storage media comprises one or more disk drives.

18. The method of claim 10, wherein the source database management platform is attached to the same one or more disk drives as the target database management platform.

19. The method of claim 10, further comprising executing, by the server computing device, a build pipeline script to initiate the allocation of the storage media and the attaching of the database management platforms to the storage media.

* * * * *